Feb. 25, 1936.    J. P. EASTMAN    2,031,825

RENEWABLE HOSE COUPLING

Original Filed Nov. 10, 1934

Inventor

J. Peter Eastman

Patented Feb. 25, 1936

2,031,825

UNITED STATES PATENT OFFICE 2,031,825

RENEWABLE HOSE COUPLING

Joseph Peter Eastman, Manitowoc, Wis.

Refiled for abandoned application Serial No. 752,485, November 10, 1934. This application September 3, 1935, Serial No. 38,882

6 Claims. (Cl. 285—86)

The invention is an improvement upon the invention shown in my Patent No. 1,428,949, and this application is filed as a substitute for abandoned application No. 752,485, filed Nov. 10, 1934.

Accordingly, it refers to a coupling the clamping of which on to a hose is effected by drawing a shell and a body toward each other, in axial direction, thereby causing a bendable gripping member to be forced inward to grip the hose, such forcing inward being aided by an annular taper provided inside the shell.

In this class of coupling, the body and shell can be used again, the gripping member only being distorted in the act of contraction, and therefore usable once only. In this suitability for use again, this type of coupling differs from the type in which the main part of the coupling is pressed inward to grip the hose.

The chief improvement consists in the fact that, after compression, the bendable tongues or fingers of the gripping member extend below the lower shoulder of the taper aforesaid, whereby such tongues are pressed into the substance of the hose over a considerable distance lengthwise of the hose, giving a gripping area of substantial length, over which area said tongues protrude into the substance of the hose a distance equal to, at least, their own thickness.

Moreover, in the preferred form of my present improvement, such tongues are arched inward, whereby their distance of intrusion into the substance of the hose is increased to, say, twice their own thickness, opposite such arches, forming a "ring-neck" in the hose, and thereby gripping it the more effectually.

A construction which helps toward forming the desired bends in such tongues is the provision, in this invention, of grooves cross-wise of the tongues, to cause the tongues to bend the more easily at the locations of such grooves.

In the drawing:—

Figs. 1, 2, 3, and 4 show the preferred form at successive stages of assembly and contraction. Of them:—

Figure 4:
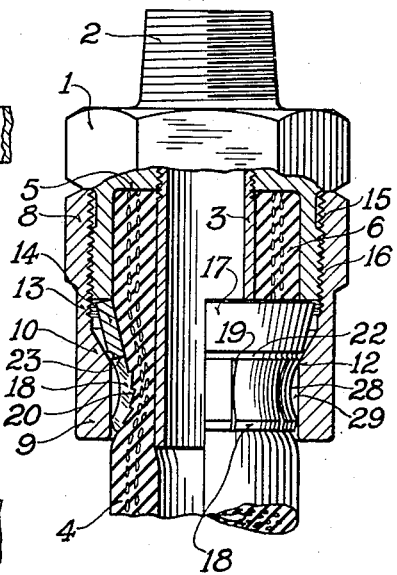

And Fig. 4 is an elevation, partly sectional, showing the contraction completed.

Figure 7:
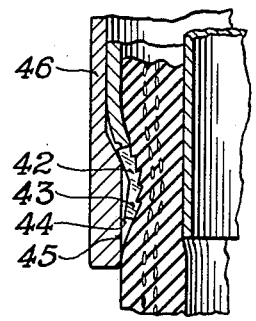
Figure 6:
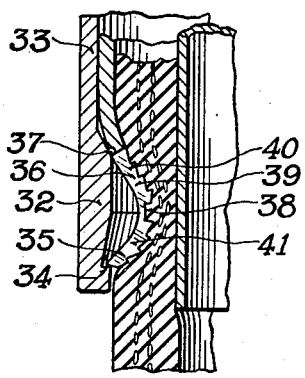
Figure 5:
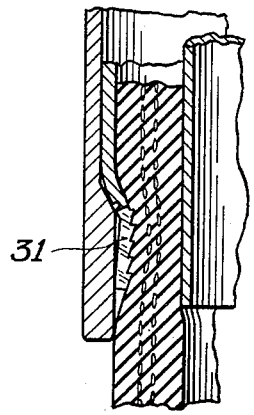

Figs. 5, 6, and 7 show modifications. All of them are elevations, sectional and broken away. Of them:—

Fig. 5 shows a form in which the tongues are not arched.

Fig. 6 shows a construction which causes the tongues to intrude still more deeply into the hose when the contraction is completed, than they do in the preferred form.

And Fig. 7 shows the tongues arched, but with the arches unsupported at their lower ends.

In this description and in the claims, the end at which the nipple is placed is called the upper end of the coupling; and in the drawing, accordingly, the coupling is drawn with its nipple upward. This is done for the sake of clearness in description, and it is to be understood that, in use, the coupling may point in any direction.

Referring to the drawing:—

Describing first the preferred form Figs. 1 to 4:—

The body 1 has the male threaded nipple 2 at its upper end, for use in joining the coupling to another hose or to other equipment. Tightly screwed into said body is the "insert" 3, a tubular reinforcement, over which the hose 4 has been pushed until it has butted against the end wall 5 of said body 1. The end of the hose accordingly fills the annular chamber 6 which is formed by said insert 3 and the flange 6a of said body.

Figure 1:
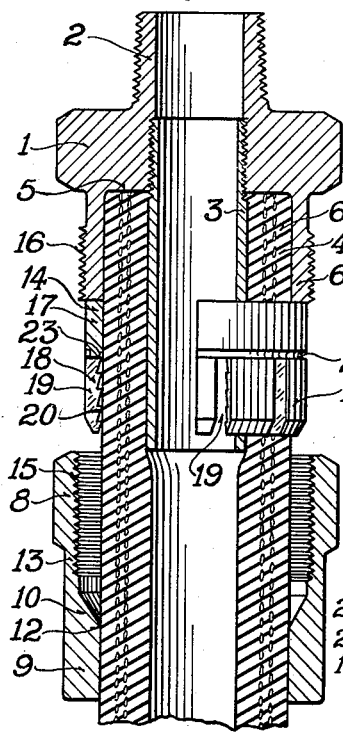
Fig. 1 is an elevation, partly sectional, showing the parts assembled on to a hose, ready for contraction.

Referring more particularly to Fig. 1, in which figure the contraction of the coupling has not yet been begun:—

The shell 8 has the lower portion 9, with bore only sufficiently large to admit the hose. Also it has the internally tapered portion 10, the lower end of its tapered face 11 being defined by the shoulder 12. Also it has the upper portion 13, the bore of which is large enough to admit the gripping sleeve 14. Also it has, in said upper portion 13, the female threading 15, adapted to co-operate with the male threading 16 provided on said flange 6a of the body, when said shell is pushed up over said sleeve 14.

Said gripping sleeve 14 as it appears in Fig. 1, that is before its shape has been changed by the process of contraction, has been slid over the hose, and consists of the cylindrical band 17, and the downwardly extending tongues 18, spaced apart by the widths of the saw-cuts or kerfs 19. Said tongues are internally barbed by the barbs 20.

The annular weakening groove 22 is provided around said sleeve, just above the roots 23 of said tongues. Or it might be placed lower, as, for instance, just below said roots, in which case it would be a gapped annular groove. Its function is to weaken the tongues at the places where it occurs, so that, when the tongues are bent, the bending may take place at those places, rather than elsewhere in the length of the tongues.

The process of applying the coupling is as follows:—

First, the parts are assembled on to the hose as shown in Fig. 1 and as hereinabove described.

Next, said shell 8 is pushed upward from the position shown in Fig. 1, over said sleeve 14, and is screwed on to said body by means of said reciprocal threadings 15 and 16, the contraction of said sleeve being effected by said screwing on, by stages as follows:—

Figure 2:
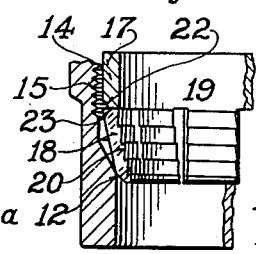
Fig. 2 is a sectional elevation, broken away, with hose and insert removed, showing the bending of the tongues or fingers at an early stage in the contraction.

Fig. 2 shows an early stage in the result of said screwing on, said tapered face 11 having then caused said tongues 18 to be bent inward a distance equal, at their lower ends, to their own thickness, such bending having taken place entirely at the place where said weakening groove 22 has weakened them as aforesaid. If this weakening groove were not provided, the bending would occur lower down in the tongues, causing a curving inward of the tips of the tongues, which inward curving would cause the tongues to pierce the hose substance, in a way that is undesirable, at a slightly later stage in the contraction. This fact will be the more easily understood when the further steps in the contracting, as below detailed, have been read.

Figure 3:
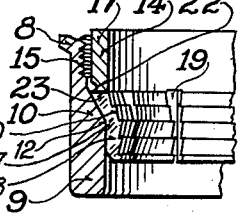
Fig. 3 is a sectional elevation, broken away, with hose and insert removed, showing the bending of the tongues or fingers at a later stage in the contraction.

Fig. 3 shows the result when said screwing on has advanced further, said shoulder 12 having formed or pressed the angle or knee 27 in said tongues.

And, finally, Fig. 4 shows the whole coupling with the contraction completed. Here said bends at said groove 22 have almost straightened out again, due to said shoulder 12, in its upward advance, having moved its point of pressure against the tongues nearly up to said grove, while, on the inside of said tongues, the pressure of the hose substance itself has been constantly exerted, tending to bend them outward. Also, for the same reason, the tongues have meantime been curled outward at their lower and middle portions, as shown in that figure, forming the arches 28, standing away a substantial distance 29 from the inside wall of said lower portion 9 of said shell 8.

Due to said arches 28, and to said distance 29 behind them, the tongues intrude into the substance of the hose a distance equal to, roughly, twice their own thickness, thereby gripping it more firmly than they would if such arches did not exist. Moreover a localized "neck-ring" grip is obtained, found in practice to be especially effective. This matter is further remarked upon hereinafter.

The present invention, accordingly, provides a way of obtaining a "neck-ring" grip in a coupling of the class in which contraction on to the hose is effected by drawing the main parts of the coupling toward each other in axial direction. Moreover, the present way is quite distinct from the way which is shown in my Patent No. 1,969,548 recently issued, and in my co-pending applications Serial Nos. 721,517 and 748,685, that way being applicable only to pressed-on couplings.

In Fig. 4 it will be noted that the contractions has included in its influence said band 17, which has been contracted at its lower edge.

In said act of screwing on, it would be undesirable that the hose should rotate relative to said body 1, and relative to said insert 3 which is rigid with said body, because, in such case, the lower end of the insert might cut the inside layer of rubber of the hose, and because a roughening of said layer, along the length of the insert, might be caused, which would lead to leakage. Therefore the screwing on is so managed that there is no relative rotation as between any of the following parts, namely, said body 1 with its insert 3, said hose 4, and said gripping sleeve 14. Consequently said shell 8, during said screwing on, must rotate relatively to said gripping sleeve, and, as it advances upward, must slide upon the outside of said tongues.

Said gripping sleeve is seated firmly upward against said flange 6a of the body, thereby being prevented from receding upward during the sliding aforesaid. Thus a firm base for the contracting of the sleeve is provided.

Said shell 8 is the only part which is translated in axial direction relative to the hose, during the screwing together, said sleeve 14 having no such motion. From the latter fact it follows that, when the lower ends of the tongues are caused to press into the substance of the hose, and even when the tongues form arches, intruding inward, there is an absence of any gouging effect such as would tend to bite out any portion of the substance of the hose.

Turning to the modifications:—

Fig. 5 shows a modification, in which the tongues 31, being of soft metal, have not formed any appreciable arch, such as is formed in the preferred form, Fig. 4. Therefore the depth to which they intrude into the substance of the hose is not appreciably more than their own thickness.

Fig. 6 shows a second modification, in which the lower portion 32 of the shell 33 has the recess 34, in which recess the tips 35 of the tongues 36 have been caught during the upward travel of said shell. The weakening groove 37 is here assumed to have performed, at an earlier stage in the contraction, the same function that is performed by the groove 22 in the preferred form. A second weakening groove 38 is, however, here provided, lower down the tongues, and preferably, though not necessarily, on their inward side. Said groove 38 tends to localize the bending, as the figure shows; and, when said tips 35 are caught as aforesaid, and are forced upward as the screwing on of said shell continues, a neck-ring 39 of V-shape in vertical cross-section, rather than of arcuate form, is formed by said tongues, which ring intrudes more sharply into the substance of the hose than do said arches 28 of the preferred form in Fig. 4. Moreover, by suitably arranging the lengths of the arms 40 and 41 of said V, and by varying the distance to which said shell 33 is finally screwed upward, a neck-ring of any desired depth of intrusion into the hose can be formed.

Fig. 7 shows a third modification, in which the tongues 42 are of hard metal, with the result that, not only have they formed an arch, as in the preferred form, but such arch is supported by its own strength. That is to say, the tips 43 of said tongues have the space 44 between them and the inside wall 45 of the lower part of the shell 46, whereby said tips receive no support from said wall.

Summarizing the matter of depth of intrusion into the substance of the hose:—

The thickness of the tongues and band of the gripping sleeve just accounts for the difference between the 2 bores of the shell. Therefore, since the sleeve and the shell both fit with a pushing fit upon the hose, the distance of intrusion of the tongues into the hose when they have been forced inward by the taper, is always equal to their own thickness, at least; and is more than that distance when the arch exists as well, the arch being an additional matter.

Thus, in the drawings, Fig. 5 shows the arch as practically non-existent. The depth of intrusion is, consequently, in that figure, equal to the thickness of the tongues, at least, but no more.

But Fig. 4, the preferred form, and Fig. 7 show the arch as roughly equivalent to doubling the thickness of the tongues, not uniformly over their whole length, which would be undesirable, but at the desired neck only.

The advantage of the neck is that it allows some of the rubber of the hose to be sprung upward and downward, thereby permitting a deep localized intrusion, deeper than would be possible without the localization.

I claim:

1. A hose coupling comprising, when assembled upon a hose but before contraction to grip the same, a gripping sleeve, said sleeve comprising a band encircling the hose and a series of substantially straight tongues extending downwardly therefrom, and, after contraction, said tongues gripping the hose, at least one of said tongues being of substantially uniform thickness, and then having, nearer its point of attachment to said band, an inward bend, causing the portion of said tongue subsequent to said bend to approach the axis of the hose, and, further from said point a second bend, outward, causing the portion of said tongues subsequent to said second bend to recede from said axis.

2. In a hose coupling, a gripping sleeve comprising a band adapted to encircle a hose and a series of tongues extending from the lower edge of said band, in combination with a tubular shell, means for drawing said shell upward relatively to said sleeve, means for causing said tongues to form arches protruding inward toward the axis of the hose during said drawing upward, and a catch provided on the inside wall of said shell adapted to engage the lower ends of said tongues, to thereby push said ends upward relatively to said band during any continuance of said drawing together, thereby causing an increase in said inward protrusion.

3. A hose coupling comprising, when assembled upon a hose but before contraction to grip the same, a gripping sleeve and a tubular shell encircling said sleeve, said sleeve comprising a band encircling the hose and a series of tongues extending downwardly from said band, and, after contraction, said tongues gripping the hose, one of said tongues then being bent, first, inward toward the axis of the hose, and thereafter outward, away from said axis, forming a knee where none had existed before contraction, the back of which knee is separated by a substantial distance from the inner wall of said shell, said knee intruding into the substance of the hose to grip the same.

4. A hose coupling comprising two members adapted each to encircle a hose, means for drawing said members toward each other in axial direction, a gripping sleeve having tongues, and means, operated automatically by said drawing together, for causing said tongues to be pressed inward into the substance of the hose to grip the same, said tongues being, upon completion of said drawing together, each substantially in the form of an outwardly concaved arch, the distance of the intrusion of said tongues into the substance of the hose being equal to the thickness of said tongues plus a substantial distance due to the rise of said arches.

5. Means for securing a coupling to a hose, such coupling including a sleeve having a collar portion adapted to encircle the hose and having tongues extending from the collar portion, and means cooperating with said sleeve for causing at least one of said tongues during contraction to bend into a permanent arch or knee in a part intermediate of the length of said tongue, with said arch or knee intruding into the substance of the hose to grip the same.

6. A hose coupling comprising, when in clamped condition upon a hose, a shell and a gripping sleeve, said sleeve having a downward portion in the form of a series of tongues, and said shell comprising an intermediate tubular portion tapered internally, such taper causing a reduction in its bore, followed by a lower cylindrical portion not so tapered, at least one of said tongues having a substantial portion of its length located below the lower extremity of said taper, and pressing into the substance of the hose to grip the same, said portion being of substantially uniform thickness and assuming the form of an outwardly concaved arch spaced from said shell, as a resultant of the force employed in the application of the shell.

J. PETER EASTMAN.